Dec. 4, 1945.   H. M. BACH   2,390,048

PIEZO-CRYSTAL DEVICE

Filed Oct. 9, 1943

INVENTOR
HENRY M. BACH
BY John J. Rogan
ATTORNEY

Patented Dec. 4, 1945

2,390,048

UNITED STATES PATENT OFFICE 2,390,048

PIEZO-CRYSTAL DEVICE

Henry M. Bach, Lawrence, N. Y., assignor to Premier Crystal Laboratories, Inc., New York, N. Y., a corporation of New York Application October 9, 1943, Serial No. 505,601

6 Claims. (Cl. 171—327)

This invention relates to piezo crystals and more particularly to crystal devices of the so-called air-gap type.

A principal object of the invention relates to an improved piezo crystal and mounting or housing of the type having an air gap or substantially confined cavity adjacent one face of the crystal, and an adjustable air gap adjacent the opposite face of the crystal.

Heretofore, one of the greatest drawbacks to the adjustable air-gap clamped type of crystal device, was that it required a very shallow gap or cavity underneath one face of the crystal. Because of the extremely accurate depth and surface dimensions for this cavity, it required very costly and accurate machining so that substantial uniformity could be obtained. One of the reasons for requiring such uniform surface in the cavity bottom was that the base of the cavity acts as one of the crystal electrodes. Therefore, in order to achieve the necessary ease of starting the crystal in vibration, and in order to obtain the necessary electrostatic coupling to the crystal, the cavity was required to be as shallow in depth as possible, and this depth was required to be uniform. However, apart from the difficulties of accurately machining such a shallow cavity, is the practical limitation that any minute unevenness in the surface contour of the cavity may result in concentrated voltage buildups at points closest to the crystal face. The result may be a corona discharge which renders the crystal unstable and eventually unreliable for accurate frequency control. This is especially true in the present day ultra high frequency control applications of the crystal.

Another serious disadvantage of the fact that the prior devices must be used with extremely shallow cavities, is the effect of cavity resonance. Because of the shallowness of the cavity, the latter may have a natural period of vibration which closely approaches the natural frequency of the crystal, and it may be very difficult to utilize (a standard cavity depth for crystals having different vibrating frequencies). Considered from the viewpoint that the crystal, when vibrating, acts somewhat in the nature of a piston due to presence of flexural vibrations, the effect of such a shallow cavity beneath the crystal is equivalent to a stiff load thereon, with the resultant disadvantage of disturbing reflections from the base of the cavity back to the crystal face. Because of the unusually shallow nature of this cavity in prior devices of this type, the disturbing reflections tend to cause damped vibrations of the crystal at its operating frequency. With a very large gap below the crystal plate the gap does not have to be varied with frequency due to cavity resonance at certain frequencies. With a minute gap as heretofore used, the gap had to be closely dimensioned and varied as a function of frequency to avoid cavity resonance.

I have found that by attaching one electrode directly to only one face of the crystal, while providing an adjustable gap electrode adjacent the opposite face, it is possible to use a cavity beneath the crystal which does not introduce the above-noted disadvantages. While so-called plated electrode crystals have heretofore been used, in all cases to my knowledge the crystal is plated on both its opposite surfaces and has been used only in connection with clamped or restrained type crystal holders. I have discovered that, in a crystal device of the air gap and adjustable electrode type, by plating only one side of the crystal, the design of the entire vibratory system including the cavity under the crystal and the gap above the crystal can be such as to utilize the crystal characteristics to the full, while greatly decreasing the cost of manufacture and assembly. As an example of such saving, whereas in prior devices of this type it has been necessary to machine the cavity to an accuracy of ±.0001 inch, in accordance with the present invention, the cavity can be of such a depth that even a roughly machined surface will suffice. Thus, instead of using a cavity of the order of .0001 to .0005 inch in depth, I am now able to use cavities of .015 inch or more. Furthermore, since the lower electrode is directly in contact with one face of the crystal, the electrostatic coupling, the activity and ease of starting are increased.

Accordingly, another principal object of the invention is to provide a piezo-crystal device having air gaps on opposite sides of the crystal, the air gap on one side being defined by an adjustable electrode, and the air gap on the other side being defined by a cavity in the base, the depth of the latter cavity being independent of the electrode which cooperates with the said other side of the crystal.

A feature of the invention is a piezo-crystal for use in adjustable air-gap holders, with the crystal having an electrode plated on only one surface thereof.

Another feature relates to an improved crystal device of the adjustable air-gap type which possesses ease of starting, a high coefficient of piezoelectric activity, and one which is singularly free from the disturbing effects of cavity resonance.

Other features and advantages not specifically enumerated will be apparent after a consideration of the following detailed descriptions and the appended claims.

By plating only one side of the crystal a greater uniformity in finishing the crystal blanks is achieved. Formerly it was necessary to finish each crystal to suit its particular holder, and also to make adjustments on the finished holder electrode gap, requiring each crystal plate to be permanently associated with a given holder. By plating the crystal on one side only, the adjustable holder electrode element is avoided and it is now possible to finish the crystal plates in one department such as a finishing department, and these plates can be selected for assembly in any one of a large number of holders in the assembly department. Thus, according to the invention, the crystal blanks are removed from the grinding or lapping machine when they are close to the desired frequency and one surface is checked for flatness. This is the surface that is plated, and the crystal is brought up to exact frequency by then lapping the other surface. In other words, the provision of the coating on one surface brings the assembly below the desired frequency and it is then possible to bring it up to the desired frequency by lapping the unplated surface. Heretofore, it was necessary to grind the crystal with extreme accuracy on both surfaces before applying both coatings and once the coatings were applied it was not possible to regrind the flat surfaces to raise the frequency. The present invention eliminates the problem of allowing for frequency reduction caused by plating after crystal finishing, and it permits uniform check on frequency prior to assembly in the final holder.

In the drawing which, for purposes of explanation, shows the invention as embodied in one known type of crystal holder.

Figure 1:
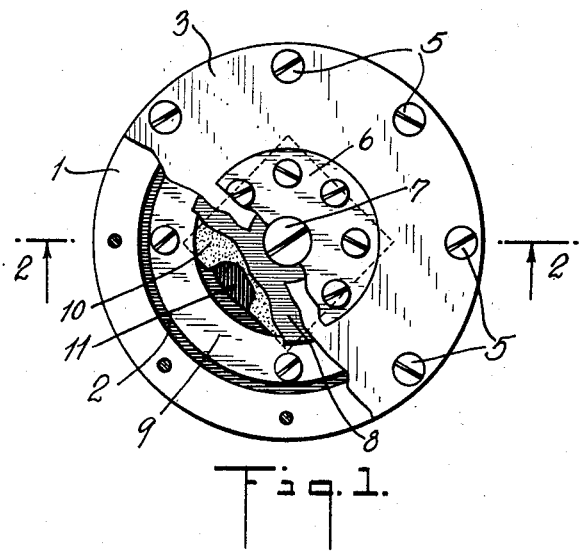
Fig. 1 is a plan view with certain parts broken away to show more clearly the interior arrangement.
Figure 2:
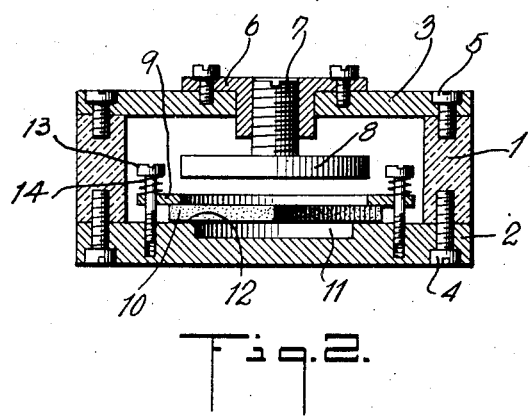
Fig. 2 is a central sectional view of Fig. 1, taken along the line 2—2 thereof.
Figure 3:
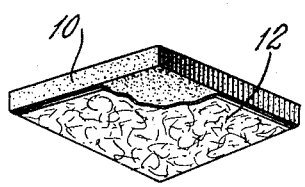
Fig. 3 is a perspective view of a crystal according to the invention.

Referring to the drawing, there is shown in generalized form, one known type of crystal housing or holder comprising for example, a cylindrical body 1, of insulation such as porcelain or ceramic which is closed off by a metal bottom plate 2 and a metal top plate 3, by means of screws 4, 5. The top plate 3 carries an internally threaded bushing 6 into which is threaded the screw member 7 fastened to the adjustable metal electrode 8. Within the holder is a clamping ring 9 which engages the corners of the crystal 10 to resiliently clamp it against the bottom 2 of the housing. For this purpose, a series of screws 13 pass loosely through the ring 9 and are threaded into member 2. Coil springs 14 are interposed between the screw heads and the clamping ring 9. For a more detailed description of this type of holder, reference may be had to U. S. Patent No. 2,131,826.

The interior face of member 2 is undercut to any desired depth to provide a cavity underneath the crystal. Heretofore, in devices of this construction, the member 2 has also functioned as the lower electrode upon which the crystal directly rests. In consequence thereof, it has been necessary heretofore to make the cavity 11 as shallow as possible in order to achieve the necessary electrostatic coupling effect to the underface of the crystal. For example, the cavity has usually been of the order of .001 inch maximum depth. As a result, the formation of the cavity and in particular the required uniformity of its surface, have involved costly and time consuming machining operations. In devices of this general type, the frequency of vibration of the system is a function not only of the inherent or natural mechanical resonance of the crystal but also of the air-gap loading on the crystal. The overall frequency has therefore been adjusted by turning member 7 to vary the upper gap between electrode 8 and the upper face of the crystal. However, because of the extremely shallow characteristic of the gap under the crystal, this latter gap may have a cavity resonance which is very closely related to the mechanical resonance of the crystal and may result in disturbing reflections from the bottom of the cavity, back to the crystal. Consequently, the vibratory characteristics of this undergap are in the prior constructions very critical; and the cavity resonance at one frequency adjustment may be entirely different in its effect, as compared with its effect at a different frequency adjustment. The cavity resonance produces substantial discontinuities in the crystal activity and frequency whenever resonance is effected.

In accordance with the invention, instead of relying on the member 2 to act as the lower electrode, the underface only of the crystal is plated or otherwise provided with an integral conductive or metal layer coating 12 which acts as the lower electrode. I have found that when only the underface of the crystal is thus coated, cavity 11 can be given any desired depth, for example as great as .020 inch or more and therefore it can be formed quickly by any method. In fact, if desired, the member 2 with the cavity 11, may be preformed by molding, pressing, etc. In other words, the cavity depth can be so great that the effects of corona discharge, which are ever present in the prior devices, are now substantially eliminated. This large gap below the plated surface presents a substantial volume of air, and even if cavity resonance is present in this space, the distance can be made a substantial number of quarter-wave lengths. Furthermore, since the radiation resistance increases when the distance is many wave lengths long, the loading on the crystal is greatly reduced. As a result, the "Q" of the crystal is increased because of the decreased stiffness of the air column under the crystal, and also the starting of the crystal is greatly facilitated.

If cavity resonance exists between the adjustable electrode and the upper unplated face of the crystal, a quantity of plating may be applied or removed from the lower plated surface to change the necessary air gap distance between the adjustable electrode and the upper or unplated surface to obtain a desired frequency, thus avoiding undesirable cavity resonance above the crystal. The velocity of sound in various media varies with the temperature and with the density of the medium. When the crystal is required to operate over large temperature ranges or at widely varying altitudes or combinations thereof, cavity resonance heretofore frequently caused erratic crystal behaviour. By using the large cavity above described, the radiation resistance is greatly increased and erratic behaviour under the above-noted conditions is eliminated.

Furthermore, the undesirable effects of cavity resonance in cavity 11 are substantially reduced since the resonance can be greatly removed from that of the crystal resonance. Consequently, the cavity 11 can be predesigned so that while it acts as an elastic cushion under the crystal, it is by no means critical. Consequently, there is more uniformity in the frequency adjustment of the crystal.

While on specific embodiment of the invention has been disclosed herein, it will be understood that various changes and modifications may be made without departing from the spirit and scope of the invention.

What I claim is:

1. A piezo-crystal device comprising a holder for the crystal, said holder having means to define a cavity adjacent one face of the crystal, an electrode integrally carried by said one face of the crystal, and an adjustable electrode gap adjacent the opposite face of the crystal, said cavity being dimensionally correlated with the crystal to reduce the effect of disturbing reflections within the cavity and without materially affecting the oscillation starting properties of the crystal.

2. A piezo-crystal device comprising a holder for the crystal having a conductive support on which the crystal rests without substantial restraint, a cavity in said support underneath the underface of the crystal, an electrode directly and integrally carried by said crystal underface, and an adjustable electrode adjacent the upper face of the crystal and defining therewith an adjustable air gap for frequency adjustment, said cavity being dimensionally correlated with the crystal to reduce the effect of disturbing reflections within the cavity and without materially affecting the oscillation starting properties of the crystal.

3. A piezo-crystal device comprising a holder for the crystal having a conductive support on which the crystal rests without substantial restraint, a cavity in the face of said support underneath the underface of the crystal, said cavity being of a depth which is greater than that at which disturbing reflections occur between the cavity walls and the underface of the crystal at the operating frequency of the crystal, an electrode directly plated on to said crystal underface for maintaining the oscillation starting sensitivity of the crystal substantially independent of the cavity depth, the upper face of the crystal being unplated, and an adjustable air-gap electrode adjacent the upper crystal face.

4. In a piezo-crystal device of the character described, a base, a cavity in said base, a crystal resting on said base and overlying said cavity, said crystal having an electrode directly plated only on the face which overlies said cavity, whereby said cavity can be of any desired depth without substantially affecting the crystal activity.

5. A piezo-crystal device according to claim 4 in which said cavity is of sufficient depth so that it can be roughly machined or similarly formed without exerting a critical effect on the crystal activity.

6. A piezo-crystal according to claim 4 in which said cavity is at least .015 inches in depth.

HENRY M. BACH.